(12) United States Patent
Li et al.

(10) Patent No.: US 10,873,955 B2
(45) Date of Patent: Dec. 22, 2020

(54) APPARATUS AND METHOD FOR ALLOCATING RADIO RESOURCES

(71) Applicant: Huawei Technologies Duesseldorf GmbH, Duesseldorf (DE)

(72) Inventors: Yilin Li, Shenzhen (CN); Jian Luo, Munich (DE); Wen Xu, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 2 days.

(21) Appl. No.: 16/289,297

(22) Filed: Feb. 28, 2019

(65) Prior Publication Data

US 2019/0200371 A1   Jun. 27, 2019

Related U.S. Application Data

(63) Continuation of application No. PCT/EP2016/070368, filed on Aug. 30, 2016.

(51) Int. Cl.
*H04W 72/12* (2009.01)
*H04W 72/08* (2009.01)
(Continued)

(52) U.S. Cl.
CPC ............. *H04W 72/12* (2013.01); *H04L 5/14* (2013.01); *H04W 72/0473* (2013.01); *H04W 72/08* (2013.01)

(58) Field of Classification Search
CPC . H04W 72/08; H04W 72/0473; H04W 72/12; H04L 5/14
See application file for complete search history.

(56) References Cited

U.S. PATENT DOCUMENTS

| 8,600,394 B2 * | 12/2013 | Auer | H04W 16/10 455/447 |
| 2009/0279500 A1 * | 11/2009 | Luo | H04L 5/0053 370/330 |

(Continued)

FOREIGN PATENT DOCUMENTS

| JP | 2008547275 A | 12/2008 |
| WO | 2010043042 A1 | 4/2010 |
| WO | 2012037643 A1 | 3/2012 |

OTHER PUBLICATIONS

Amano et al.,"Laboratory experiments of TDD/SDMA OFDM Wireless Backhaul in a downlink for Hierarchical Broadband Wireless Access Systems," Institute of Electrical and Electronics Engineers, New York, New York (2008).

(Continued)

*Primary Examiner* — Mehmood B. Khan
(74) *Attorney, Agent, or Firm* — Leydig, Voit & Mayer, Ltd.

(57) ABSTRACT

An apparatus and corresponding method for scheduling and allocating radio resources are provided. The apparatus comprises a processor, which is configured to schedule a plurality of transmission flows into a plurality of groups according to a transmission request of at least one UE and according to interference information. Further, the processor is configured to allocate a transmission duration to each transmission flow, wherein transmission flows of the same group are allocated the same transmission duration, according to traffic demand information of the at least one. The processor is configured to allocate a transmission power to each transmission flow, wherein for transmission flows of the same group the transmission powers are allocated according to a channel quality of each transmission flow of the group.

20 Claims, 14 Drawing Sheets

(51) Int. Cl.
H04L 5/14 (2006.01)
H04W 72/04 (2009.01)

(56) References Cited

U.S. PATENT DOCUMENTS

| | | | |
|---|---|---|---|
| 2011/0182174 A1* | 7/2011 | Pi | H04W 88/10 370/229 |
| 2011/0222506 A1* | 9/2011 | Szymanksi | H04W 72/087 370/330 |
| 2012/0230267 A1* | 9/2012 | Sundaresan | H04W 72/06 370/329 |
| 2012/0236731 A1* | 9/2012 | Beaudin | H04W 72/082 370/248 |

OTHER PUBLICATIONS

Qiao et al.,"Enabling Multi-Hop Concurrent Transmissions in 60 GHz Wireless Personal Area Networks," IEEE Transactions on Wireless Communications, vol. 10, No. 11, Institute of Electrical and Electronics Engineers, New York, New York (Nov. 2011).

Niu et al.,"Energy-Efficient Scheduling for mmWave Backhauling of Small Cells in Heterogeneous Cellular Networks," IEEE Transactions on Vehicular Technology, vol. 66, No. 3, Institute of Electrical and Electronics Engineers, New York, New York (Mar. 2017).

"IEEE Standard for Information Technology—Telecommunications and information exchange between systems—Local and metropolitan area networks—Specific Requirements, Part 15.3: Wireless Medium Access Control(MAC) and Physical Layer (PHY) Specifications for High Rate Wireless Personal Area Networks(WPANs), Amendment 2: Millimeter-wave-based Alternative Physical Layer Extension," IEEE Std 802.15.3c-2009,(Amendment to IEEE Std 802.15.3-2003), pp. 1-203, Institute of Electrical and Electronics Engineers, New York, New York (Oct. 12, 2009).

"IEEE Standard for Information Technology—Telecommunications and information exchange between systems—Local and metropolitan area networks—Specific Requirements, Part 11: Wireless LAN Medium Access Control (MAC) and Physical Layer (PHY) Specifications, Amendment 3: Enhancements for Very High Throughput in the 60 GHz Band," IEEE Std 802.11ad™—2012, IEEE Computer Society, pp. 1-628, Institute of Electrical and Electronics Engineers, New York, New York (Dec. 28, 2012).

Akdeniz et al.,"Millimeter Wave Channel Modeling and Cellular Capacity Evaluation," IEEE Journal on Selected Areas in Communications, vol. 32, No. 6, Institute of Electrical and Electronics Engineers, New York, New York (Jun. 2014).

Qiao et al.,"Multi-hop Concurrent Transmission in Millimeter Wave WPANs with Directional Antenna," IEEE Communications Society subject matter experts for publication in the IEEE ICC 2010 proceedings, Institute of Electrical and Electronics Engineers, New York, New York (2010).

Cai et al.,"REX: A Randomized EXclusive Region Based Scheduling Scheme for mmWave WPANs with Directional Antenna," IEEE Transactions on Wireless Communications, vol. 9, No. 1, Institute of Electrical and Electronics Engineers, New York, New York (Jan. 2010).

"Wireless backhaul/relay for NR," 3GPP TSG RAN WG1 Meeting #86, Göteborg, Sweden, R1-166488, pp. 1-4, 3rd Generation Partnership, Project, Valbonne, France (Aug. 22-26, 2016).

\* cited by examiner

| SMDA group ID | 1 | 2 | 3 |
|---|---|---|---|
| Scheduled flow | A → B<br>A → G<br>E → C | B → D<br>F → C | C → A |
| Minimum required duration | 200<br>100<br>150 | 100<br>150 | 300 |

⬇

| Maximum duration | 200 | 150 | 300 |
|---|---|---|---|

⬇

| Proportional allocable duration | 307 | 231 | 462 |
|---|---|---|---|

⬇

| Allocated duration | 307<br>307<br>307 | 231<br>231 | 462 |
|---|---|---|---|

Fig. 5

APPARATUS AND METHOD FOR ALLOCATING RADIO RESOURCES

CROSS-REFERENCE TO RELATED APPLICATIONS

This application is a continuation of International Application No. PCT/EP2016/070368, filed on Aug. 30, 2016, the disclosure of which is hereby incorporated by reference in its entirety.

TECHNICAL FIELD

Embodiments of the present disclosure relate to an apparatus and a method for scheduling and allocating radio resources. Embodiments of the present disclosure can particularly be employed in a heterogeneous network (HetNet). Further, it can be used for interference management and radio resource allocation of downlink (DL) and uplink (UL) transmissions on millimetre-wave (mm-wave) backhaul and access links of a HetNet.

BACKGROUND

Frequencies of mm-waves provide orders of magnitude larger spectrum than current cellular allocations. However, some unfavorable channel propagation characteristics in mm-wave bands bring great challenges in technical aspects of communication systems. On the one hand side, directional antennas at both transceiver sides are required to compensate for higher free space path loss via appropriate beamforming techniques. On the other hand side, a HetNet with small cells, which are densely deployed and underlying conventional homogeneous macro cells, has been considered as a promising deployment strategy, in order to cope with the increased free space path loss, and to lower transmit power.

Within a HetNet, as shown in FIG. 14, a macro cell base station (BS) conventionally provides both mm-wave backhaul and access links, as well as signaling exchange over, for example, sub-6 GHz links. In contrast, a small cell access point (AP) conventionally provides only mm-wave access links. To support such a HetNet, equipping all small cells with wired/fiber backhaul is economically not feasible. It is more attractive to utilize wireless backhauling by sharing the same air interface and spectrum with the access links. This concept is called "self-backhauling". By leveraging the abundant available spectrum, a HetNet with wireless backhauling at the mm-wave band has the potential to provide orders of gigabytes per second (Gbps) capacity for combined downlink (DL) and uplink (UL) transmissions of user equipment (UE). Directional antennas with beamforming can further reduce the interference between the links, and thus enable spatial multiplexing and diversity. FIG. 14 illustrates the conventional self-backhauling scenario discussed above.

In the mm-wave related wireless local area network (WLAN) standard 802.11ad and in the wireless personal area network (WPAN) standard 802.15.3c, a time-division multiple access (TDMA) scheme has been adopted. However, these standards do not exploit spatial multiplexing, which is considered one of the key techniques for improving network performance. Furthermore, no scheduling procedure exists in both standards.

A multi-hop concurrent transmission scheme has been proposed, in order to take advantage of the spatial reuse and time division multiplexing gain. In particular, a hop selection metric for a piconet controller, to select appropriate relay hops for traffic flow, has been designed. Consequently, in this scheme nodes are allowed to transmit concurrently in communication links. However, the scheme is not feasible in the context of HetNets, and is not suitable for both DL and UL transmissions on joint backhaul and access links. Moreover, time and power resource allocation are not included.

In another proposed scheme, conditions at which concurrent transmission always outperforms TDMA transmission, have been derived, and a randomized scheduling procedure called REX has been proposed. The procedure bases on the concept of an exclusive region supporting concurrent transmissions. One drawback of this scheme is, however, that it neither applies to joint backhaul and access links in a HetNet, nor to a case with both DL and UL transmissions. Another drawback of the scheme is that no optimization, particularly no increased network throughput, is explicitly demonstrated. The exclusive region guarantees only that the conditions, at which spatial multiplexing outperforms TDMA, are fulfilled, but does not provide any analysis on how much gain that spatial multiplexing can achieve.

In another proposed mm-wave backhauling scheme, concurrent transmissions are exploited for lower energy consumption and higher energy efficiency. Although spatial multiplexing is exploited as well, in order to improve network performance, different optimization objectives (energy efficiency) are considered. Moreover, the proposed scheme is not applicable to the complicated joint backhaul and access links in a HetNet with DL and UL transmissions.

SUMMARY

In view of the above-mentioned problems and disadvantages, embodiments of the present invention aim to improve the prior art.

An object is to provide an improved apparatus and method for allocating radio resources, in particular in the context of maximizing network throughput in mm-wave HetNet. Thereby, the main challenge of allocating radio resources to both backhaul and access links for both DL and UL transmissions should be addressed, wherein the same radio resource and air interfaces are to be shared between mm-wave backhaul and access links. Further, embodiments of the invention may be compatible with a time-division duplex (TDD) mode.

For providing a solution to the above-mentioned object, embodiments of the present invention take into account five key factors:

Firstly, coupling between backhaul and access links is taken into account, because radio resources allocated to backhaul links limit the access throughput.

Secondly, TDD constraint are taken into account, since a BS, AP or UE can only either transmit or receive for a given time slot, but cannot simultaneously transmit and receive.

Thirdly, interference among transmission flows is taken into account. Therefore, interference information has to be acquired before scheduling and resource allocation (by interference sensing). Further, a dynamic change of interference characteristics should be monitored. Based on the interference information, Spatial Division Multiple Access (SDMA) can be leveraged when carrying out the scheduling.

Fourthly, power allocation is taken into account. Assuming a large antenna array with extensive beamforming, transmit (Tx) power allocation for multiple beams at BS and APs need to be optimized.

Fifthly, the feasibility of the solution must be considered. That is, a feasible solution should be able to work in polynomial time, and with a low computational complexity.

An object is achieved by the solution provided in the enclosed independent claims. This solution takes into account all five key factors. Advantageous implementations are further defined in the dependent claims.

A first aspect of the present invention provides an apparatus for scheduling and allocating radio resources, the apparatus comprising a processor configured to schedule a plurality of transmission flows into a plurality of groups according to a transmission request of at least one user equipment, UE, and according to interference information, allocate a transmission duration to each transmission flow, wherein transmission flows of the same group are allocated the same transmission duration, according to traffic demand information of the at least one UE, allocate a transmission power to each transmission flow, wherein for transmission flows of the same group the transmission powers are allocated according to a channel quality of each transmission flow of the group.

An UE is a device connected to a BS or to an AP. Interference information is information on mutual interference between transmission flows. Since a noise experienced by all UEs is the same, the channel gain, also called channel quality, is the relevant quantity. The groups can, for instance, be SDMA groups including SDMA concurrent transmission flows.

The use of the scheduling and radio resource allocation apparatus of the first aspect leads to significant increases of the network performance. In particular, a significant gain in average user throughput is observed, for example when compared to a conventional TDMA scheme. Thereby, the performance gain is particularly achieved with a flat transmission power. Moreover, the apparatus allows optimizing power allocation, and meeting power constraints.

In a first implementation form of the apparatus according to the first aspect, the processor is further configured to transmit transmission flows of the same group simultaneously and with the allocated transmission duration and powers.

The transmission flows may consist of both DL and UL flows on backhaul and access links. Accordingly, coupling between backhaul and access links is taken into account, which further increases access throughput.

In a second implementation form of the apparatus according to the first aspect as such or according to the first implementation form of the first aspect, for the scheduling of the transmission flows the processor is configured to find a maximum number of transmission flows for each group, which can be transmitted simultaneously without violating any Time Division Duplex (TDD) constraint, or half-duplex constraint, and without causing interference above a threshold value.

Accordingly, employing the apparatus takes into account TDD constraints and interference between individual transmission flows.

In a third implementation form of the apparatus according to the second implementation form of the first aspect, for the finding of the maximum number of transmission flows for each group the processor is configured to generate a conflict graph according to the transmission request and the interference information, the conflict graph including nodes, which represent transmission flows, and edges, which represent TDD constraints, or half-duplex constraints, and interference above a threshold between two selected transmission flows, and find a maximum number of nodes in the conflict graph, for which no edges exists between any two selected nodes.

Thus, a feasible solution that provides scheduling and allocation results in polynomial time and with low computational complexity is achieved.

In a fourth implementation form of the apparatus according to the first aspect as such or according to any of the previous implementation forms of the first aspect, for the scheduling of the transmission flows the processor is configured to associate each group and/or each transmission flow of the same group with a group identification (ID).

By using group IDs, the signaling overhead may be reduced.

In a fifth implementation form of the apparatus according to the first aspect as such or according to any of the previous implementation forms of the first aspect, the processor is further configured to receive the interference information from the at least one UE or from at least one access point, AP, wherein the interference information is acquired by the at least one UE and/or AP in an interference sensing procedure.

In a sixth implementation form of the apparatus according to the fifth implementation form of the first aspect, for the interference sensing procedure of the at least one UE and/or AP the processor is configured to schedule a plurality of pilot transmissions into a plurality of pilot stages according to the transmission request of the at least one UE and/or a transmission request of the at least one AP, and determine to which UE and/or AP to transmit which pilot at which pilot stage.

In different pilot stages, different transmitters transmit at least one pilot. The interference sensing procedure can reuse results obtained during scheduling. Thus, the overall efficiency is improved.

In a seventh implementation form of the apparatus according to the sixth implementation form of the first aspect, for the scheduling of the pilot transmissions the processor is configured to find a maximum number of pilot transmissions of each pilot stage, which can be transmitted simultaneously without violating any TDD constraint, or half-duplex constraint.

TDD constraints or half-duplex constraints can be reused by the apparatus from the scheduling of transmission flows into groups. Thus, the efficiency of the interference sensing as a whole is improved.

In an eighth implementation form of the apparatus according to the first aspect as such or according to any of the previous implementation forms of the first aspect, for the allocating of the transmission duration to each transmission flow the processor is configured to determine a maximum transmission duration for the transmission flows of each group, and calculate the transmission duration to be allocated to the transmission flows of said group based on the maximum transmission duration and a length of a superframe.

The transmission duration can thus be optimized according to the grouped transmission flows and the superframe length.

In a ninth implementation form of the apparatus according to the first aspect as such or according to any of the previous implementation forms of the first aspect, for the allocating of the transmission power to each transmission flow the processor is configured to allocate a larger transmission power to a transmission flow with a higher channel quality, and allocate a smaller transmission power to a transmission flow with a lower channel quality.

Thereby, throughputs of transmission flows are enhanced, which improves the overall efficiency of the apparatus.

In a tenth implementation form of the apparatus according to the first aspect as such or according to any of the previous implementation forms of the first aspect, the processor is further configured to obtain the traffic demand information from the at least one UE during an initial access of the UE to a base station, BS, and/or obtain the channel quality of the transmission flows from the at least one UE during an initial access of the UE to the BS.

UE traffic demand may change over time. Thus, the UE can preferably update at any time the traffic demand information to the BS.

In an eleventh implementation form of the apparatus according to the first aspect as such or according to any of the previous implementation forms of the first aspect, the processor is configured to exchange by signaling with the at least one UE and/or with at least one AP, a result of the scheduling of the transmission flows and a result of the allocating of the transmission durations.

The signaling exchange ensures that all UEs and APs are instantaneously aware of the relevant transmission parameters.

In a twelfths implementation form of the apparatus according to the eleventh implementation form of the first aspect, the result of the scheduling of the transmission flows comprises group IDs, each group ID being associated to one group and/or to each transmission flow of one group, and the result of the allocating of the transmission durations comprises a transmission duration of each group and a transmission start time of a first group.

By signaling only the above-mentioned parameters, a signaling overhead is significantly reduced.

In a thirteenth implementation form of the apparatus according to the first aspect as such or according to any of the previous implementation forms of the first aspect, the processor is configured to update the interference information, when a UE and/or an AP moves, becomes idle, and/or newly emerges, and reschedule the transmission flows into a plurality of new groups according to the transmission request of the at least one UE and according to the updated interference information.

Thereby, the user throughput can be maintained high at any time.

A second aspect of the present invention provides a method for scheduling and allocating radio resources, the method comprising the steps of scheduling, by a base station, BS, a plurality of transmission flows into a plurality of groups according to a transmission request of at least one user equipment, UE, and according to interference information, allocating, by the BS, a transmission duration to each transmission flow, wherein transmission flows of the same group are allocated the same transmission duration, according to traffic demand information of the at least one UE, and allocating, by the BS and/or at least one access point, AP, a transmission power to each transmission flow, wherein for transmission flows of the same group the transmission powers are allocated according to a channel quality of each transmission flow of the group.

In a first implementation form of the method according to the second aspect, the method further comprises transmitting, by the BS and/or at least one AP, transmission flows of the same group simultaneously and with the allocated transmission duration and powers.

In a second implementation form of the method according to the second aspect as such or according to the first implementation form of the second aspect, the scheduling of the transmission flows comprises finding a maximum number of transmission flows for each group, which can be transmitted simultaneously without violating any Time Division Duplex, TDD, constraint, or half-duplex constraint, and without causing interference above a threshold value.

In a third implementation form of the method according to the second implementation form of the second aspect, the finding of the maximum number of transmission flows for each group comprises generating a conflict graph according to the transmission request and the interference information, the conflict graph including nodes, which represent transmission flows, and edges, which represent TDD constraints, or half-duplex constraints, and interference above a threshold between two selected transmission flows, and finding a maximum number of nodes in the conflict graph, for which no edges exists between any two selected nodes.

In a fourth implementation form of the method according to the second aspect as such or according to any of the previous implementation forms of the second aspect, the scheduling of the transmission flows comprises associating each group and/or each transmission flow of the same group with a group ID.

In a fifth implementation form of the method according to the second aspect as such or according to any of the previous implementation forms of the second aspect, the method further comprises receiving the interference information from the at least one UE or from at least one access point, AP, wherein the interference information is acquired by the at least one UE and/or AP in an interference sensing procedure.

In a sixth implementation form of the method according to the fifth implementation form of the second aspect, the interference sensing procedure of the at least one UE and/or AP comprises scheduling, by the BS, a plurality of pilot transmissions into a plurality of pilot stages according to the transmission request of the at least one UE and/or a transmission request of the at least one AP, and determining to which UE and/or AP to transmit which pilot at which pilot stage.

In a seventh implementation form of the method according to the sixth implementation form of the second aspect, the scheduling of the pilot transmissions comprises finding a maximum number of pilot transmissions of each pilot stage, which can be transmitted simultaneously without violating any TDD constraint, or half-duplex constraint.

In an eighth implementation form of the method according to the second aspect as such or according to any of the previous implementation forms of the second aspect, the allocating of the transmission duration to each transmission flow comprises determining a maximum transmission duration for the transmission flows of each group, and calculating the transmission duration to be allocated to the transmission flows of said group based on the maximum transmission duration and a length of a superframe.

In a ninth implementation form of the method according to the second aspect as such or according to any of the previous implementation forms of the second aspect, the allocating of the transmission power to each transmission flow comprises allocating a larger transmission power to a transmission flow with a higher channel quality, and allocating a smaller transmission power to a transmission flow with a lower channel quality.

In a tenth implementation form of the method according to the second aspect as such or according to any of the previous implementation forms of the second aspect, the method further comprises obtaining the traffic demand information from the at least one UE during an initial access of the UE to the BS, and/or obtaining the channel quality of the transmission flows from the at least one UE during an initial access of the UE to the BS.

In an eleventh implementation form of the method according to the second aspect as such or according to any of the previous implementation forms of the second aspect, the method further comprises exchanging by signaling between the BS and the at least one UE and/or at least one AP, a result of the scheduling of the transmission flows and a result of the allocating of the transmission durations.

In a twelfths implementation form of the method according to the eleventh implementation form of the second aspect, the result of the scheduling of the transmission flows comprises group IDs, each group ID being associated to one group and/or to each transmission flow of one group, and the result of the allocating of the transmission durations comprises a transmission duration of each group and a transmission start time of a first group.

In a thirteenth implementation form of the method according to the second aspect as such or according to any of the previous implementation forms of the second aspect, the method further comprises updating the interference information, when a UE and/or an AP moves, becomes idle, and/or newly emerges, and rescheduling the transmission flows into a plurality of new groups according to the transmission request of the at least one UE and according to the updated interference information.

With the method of the second aspect and its implementation forms, the same advantages are achieved as with the apparatus of the first aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and embodiments of the present invention will be explained in the following description of specific embodiments in relation to the enclosed drawings, in which

FIG. 5 illustrates a step of transmission duration allocation.

DETAILED DESCRIPTION OF EMBODIMENTS

Embodiments of the present invention generally propose a scheduling and resource allocation apparatus and method, which may be applied to different scenarios. For instance, an application scenario may be interference sensing (long period), another application scenario may be scheduling and resource allocation (long period), and another application scenario may be an interference and scheduling update, which may be triggered by certain events that change the interference situation in the network (short period).

In particular, the scheduling and resource allocation apparatus and method perform three main steps. Further, they are based on a flow model, wherein each active transmission link is modelled as a transmission flow.

Figure 1:
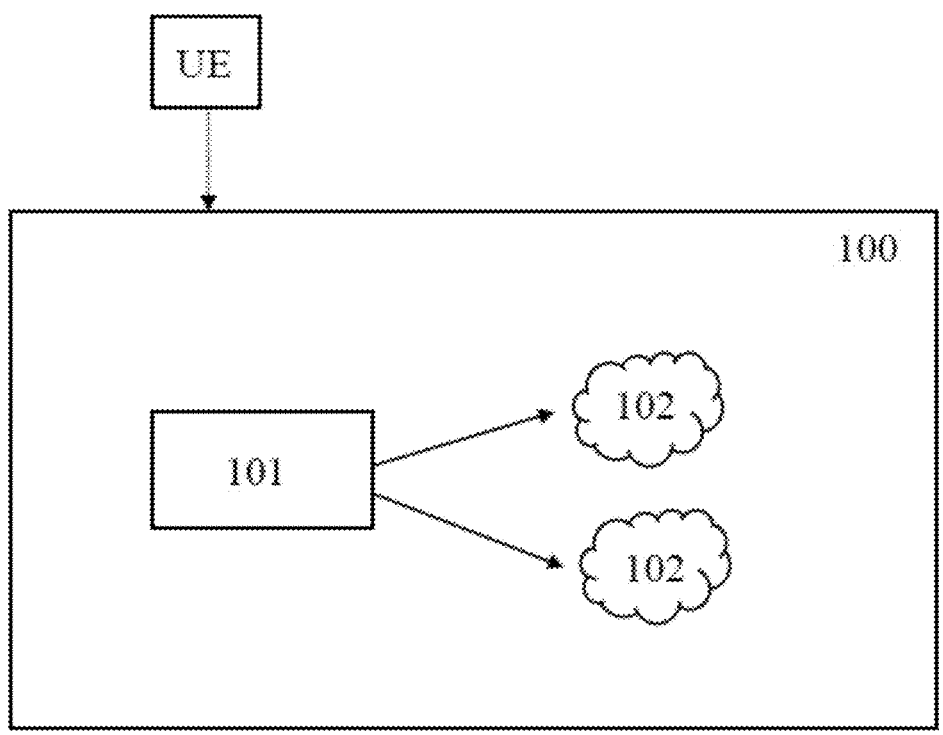
FIG. 1 shows an apparatus for scheduling and allocating radio resources according to an embodiment of the present invention.

FIG. 1 shows an apparatus 100 according to an embodiment of the present invention. The apparatus 100 is configured for scheduling and allocating radio resources, in particular of DL and UL transmissions on mm-wave backhaul and access links of a HetNet. The apparatus 100 of FIG. 1 includes at least one processor 101, which is configured to carry out the three main steps mentioned above.

Firstly, the processor 101 is configured to schedule a plurality of transmission flows into a plurality of groups 102, as indicated in FIG. 1. The scheduling is carried out according to a transmission request of at least one UE, and according to interference information. For instance, concurrent/SDMA transmissions may be scheduled into each group 102 by using a maximum independent set (MIS) based heuristic scheduling algorithm performed by the processor 101. The transmission flows of a group 102 are advantageously for simultaneous transmission.

Secondly, the processor 101 is configured to allocate a transmission duration to each transmission flow, wherein transmission flows of the same group 102 are allocated the same transmission duration. The allocation is carried out according to traffic demand information of the at least one UE. That is, the transmission duration is allocated to each transmission flow according to the scheduling result of the first step. Each group 102 is accordingly associated with one transmission duration.

Thirdly, the processor 101 is configured to allocate a transmission power to each transmission flow, wherein for transmission flows of the same group 102 the transmission powers are allocated according to a channel quality of each transmission flow of the group 102. That is, the transmission powers are allocated to the transmission flows that are to be transmitted from the same BS and/or AP simultaneously.

The apparatus 100 of FIG. 1 may be a BS, or may be employed at least partly in a BS. In this case, the processor 101 may be at least a part of a processing unit of the BS. The apparatus 100 may, however, also be distributed over at least one BS and/or, for example, over at least one AP. That is, for example, the first and second main step may be carried out in a processor of a BS, while the third step is carried out in a processor of an AP.

Figure 2:
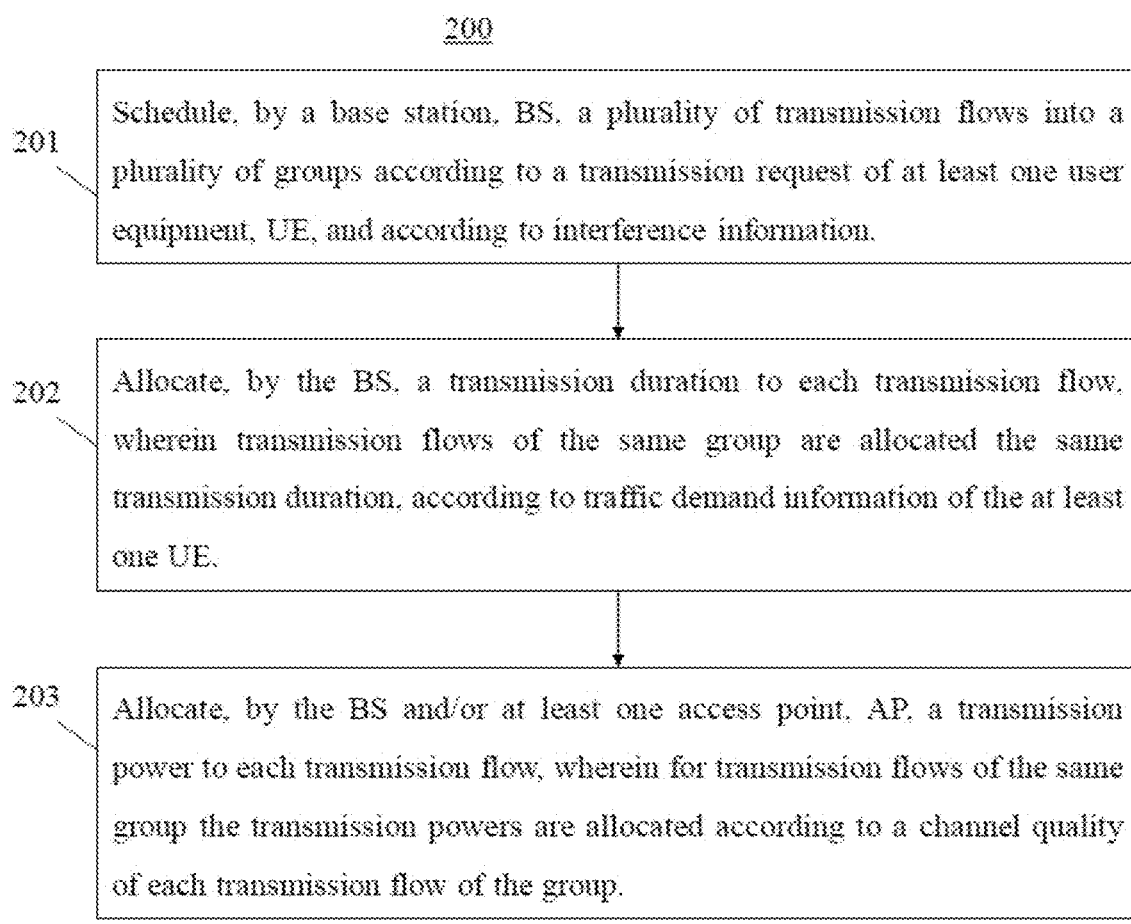
FIG. 2 shows a method for scheduling and allocating radio resources according to an embodiment of the present invention.

FIG. 2 shows a method 200 according to another embodiment of the present invention. The method includes three main steps 201, 202, 203, which correspond to the three main steps, which the processor 101 of the apparatus 100 is configured to carry out.

In particular, in a first step 201 of the method 200, a BS schedules a plurality of transmission flows into a plurality of groups 102 according to a transmission request of at least one UE and according to interference information. The scheduling may be performed, for instance, by the apparatus 100, which may be or may be employed in the BS. In a second step 202 of the method 200, the BS allocates a transmission duration to each transmission flow, wherein transmission flows of the same group 102 are allocated the same transmission duration, according to traffic demand information of the at least one UE. In a third step 203 of the method 200, the BS and/or at least one AP allocates a transmission power to each transmission flow, wherein for transmission flows of the same group 102 the transmission powers are allocated according to a channel quality of each transmission flow of the group.

In the following, embodiments of the present invention are described in more detail, particularly with reference to method steps. However, the processor 101 of the apparatus 100 may be configured to carry out each specifically described method step.

Figure 3:
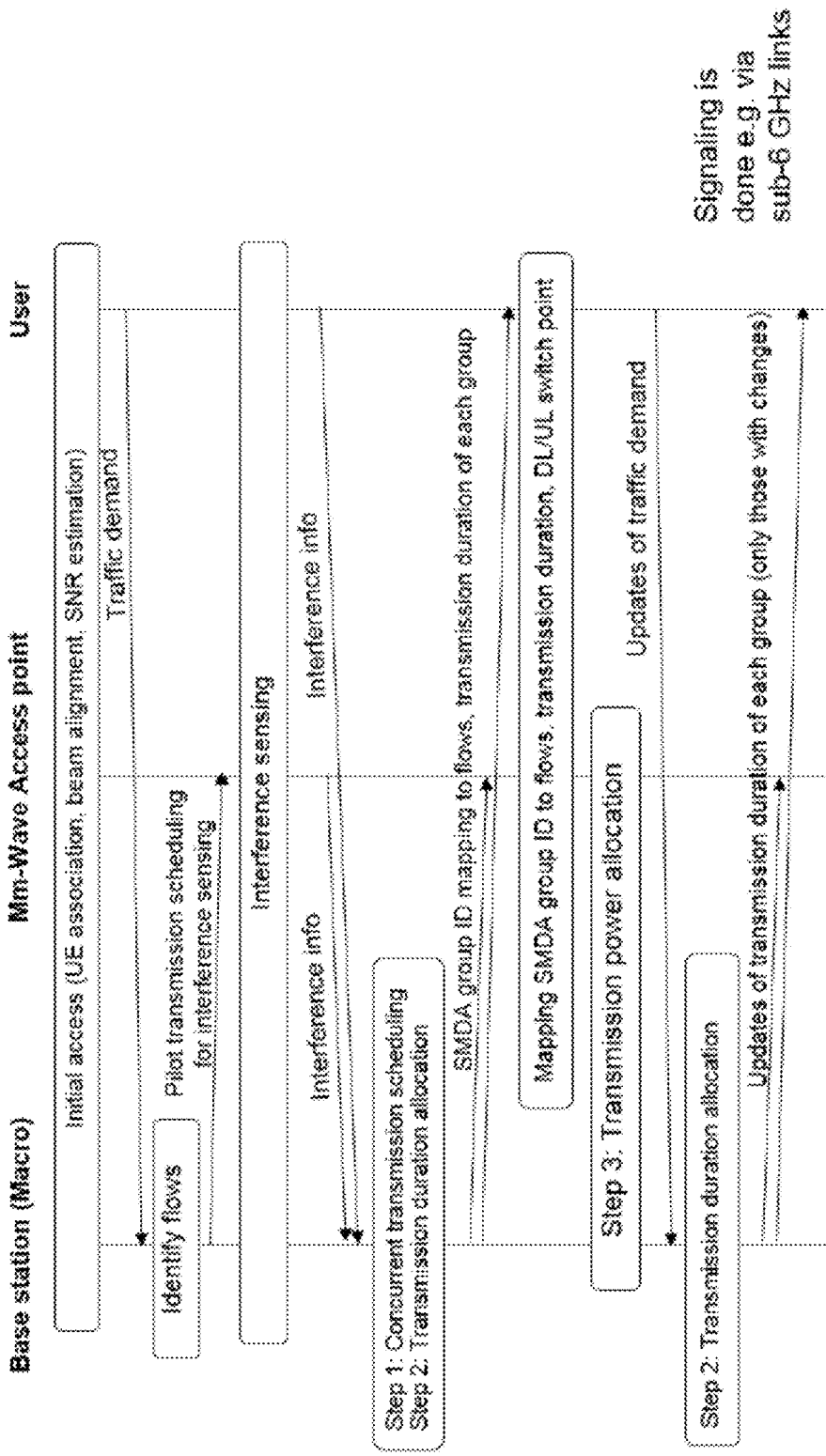
FIG. 3 shows an overall procedure of scheduling, which includes a method according to an embodiment of the present invention and an associated signalling exchange procedure.

FIG. 3 shows in detail an overall procedure, which uses the above-described apparatus 100 and method 200 according to embodiments of the present invention. As shown in FIG. 3, the overall procedure may be carried out between a BS (Macro), at least one (mm-wave) AP, and at least one UE (User).

At first, an initial access procedure is carried out by at least one UE and/or AP. This procedure includes, for instance, UE association to a BS or AP, beam alignment (Tx and/or Rx beams), and Signal to Noise Ratio (SNR) estimation. The SNR estimation is preferably done at the at least one UE. From this procedure, the BS is able to collect the traffic demand information of the at least one UE, for example, over sub-6 GHz links, and may further identify the required mm-wave transmission flows. These transmission flows may consist of both DL and/or UL on backhaul and/or access links.

Then, an interference sensing procedure is preferably carried out, most preferably in all network elements (i.e. in BS, APs and UEs), and according to a scheduling of the BS on pilot transmissions. In particular, after the initial access, the BS schedules pilot transmissions to the APs and UEs, for example, over sub-6 GHz links, for the purpose of interference sensing. The interference sensing procedure is preferably a long-period procedure (e.g. is carried out once per several superframes). When the interference sensing procedure is finished, the APs and/or UEs will report the obtained interference information among different transmission flows to the BS, for example, over sub-6 GHz links. The interference information can then be used for the transmission flow scheduling described next.

Based on the report, the first two steps are carried out by the apparatus 100 and according to the method 200. In FIG. 3 the apparatus 100 is accordingly employed at least partly at the BS. That is, concurrent transmission (e.g. SDMA as in FIG. 3) scheduling (Step 1) and transmission duration allocation (Step 2) are carried out. In particular, with the mm-wave transmission flows and interference information, the processor 101 may be configured to calculate the concurrent transmission scheduling and transmission duration allocation (described later in more detail).

According to the obtained results, the BS then informs the APs and UEs about group IDs (e.g. SDMA group ID mapping to flows in FIG. 3) and transmission duration allocation of each group 102. In particular, the BS may inform the APs and UEs, for instance, over sub-6 GHz links. As noted previously, each group 102 contains transmission flows that can be scheduled simultaneously.

With these received parameters, the APs and UEs can derive an allocated transmission time and duration of the transmission flows, as well as a TDD switching point of transmission frames (i.e. APs and the BS can have different TDD switching points). In particular, after demodulating the group IDs and transmission duration, the APs and UEs may derive the transmission time instant and transmission duration of corresponding transmission flows. In addition, TDD switching points of DL and UL transmissions may also be derived in APs.

Finally, Tx power allocation at the BS and/or APs is carried out (Step 3). In particular, based on the concurrent transmission scheduling outcomes, the BS and APs allocate transmission powers to the corresponding flows (described later in more detail).

After the above-described scheduling and resource allocation, the remaining part of the overall procedure shown in FIG. 3 is a regular re-allocation of a duration of each group 102. In particular, as the user traffic demand may vary at different frames, the regular re-allocation of a transmission duration in each group 102 may be run in a short period manner. Traffic demand and updated transmission duration allocation may be exchanged over, for example, sub-6 GHz links.

Figure 6:
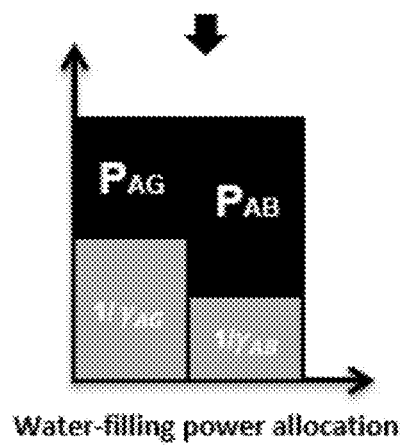
FIG. 6 illustrates a step of transmission power allocation.
Figure 6:
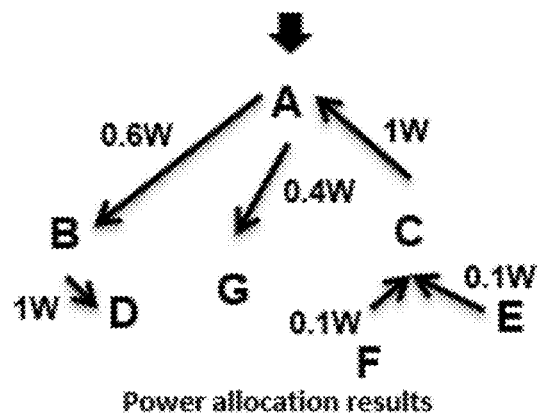

In the following the three main steps 201-203 for the radio scheduling and resource allocation are described in more detail with respect to FIGS. 4-6. That is, specific embodiments building on the apparatus 100 of FIG. 1 and method 200 of FIG. 2 are described.

Figure 4:
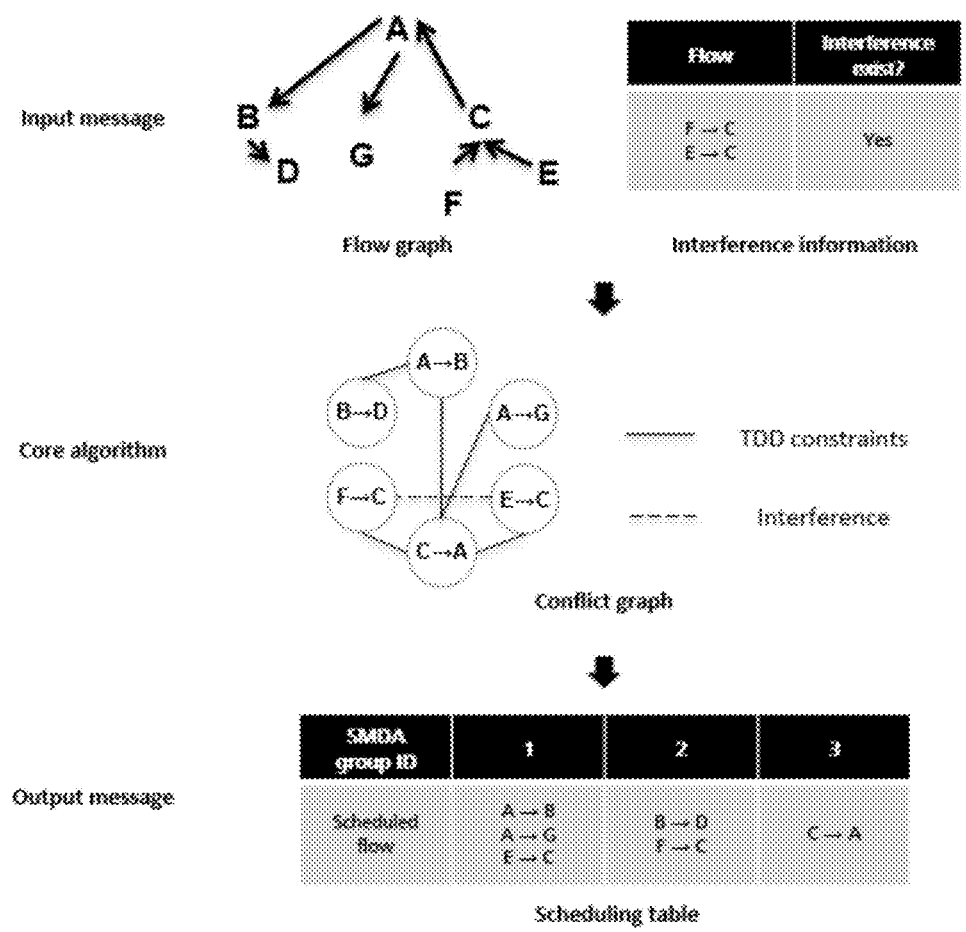
FIG. 4 illustrates a step of concurrent transmission scheduling.

For the first step 201, as illustrated in FIG. 4 a concurrent transmission scheduling algorithm may be run, for instance by the processor 101. The processor 101 is preferably located at least partly at the BS. The main idea of this algorithm is determining, which transmission flow(s) are to be transmitted in which group 102 according to the UE transmission request and the interference information. The interference information may be acquired during initial access of a UE to the BS, and according to the interference sensing mentioned in above overall procedure.

As input message for the first step 201, a transmission flow graph is generated from UE traffic demand and interference information acquired by interference sensing. Both inputs are exchanged between the BS and the APs and/or UEs, particularly by the signalling method mentioned in the above overall procedure, for example, over sub-6 GHz links. In the transmission flow graph, network elements (i.e. BS, APs and UEs) are represented by nodes (capital letters in FIG. 4), and transmission flows are represented by edges among the nodes (arrows in FIG. 4).

With the interference information, the transmission flow graph is transferred, for instance by the processor 101, to a new graph, which is called "conflict graph". In this conflict graph, nodes represent the transmission flows (edges in the flow graph), and edges depict the "conflicting relationship" among the transmission flows. To be more specific, there exists an edge between two nodes (flows) in the conflict graph, if either the two flows are coupled by TDD constraints, or half-duplex constraints, or if there exists interference above a threshold value between the two flows. Obviously, transmission flows that are "connected" by an edge cannot be scheduled simultaneously, as the corresponding network element cannot transmit and receive at the same time, or if simultaneous transmission would result in strong interference above the threshold value.

Having the conflict graph, a maximum independent sent (MIS) based scheduling algorithm is preferably run as core of the whole algorithm, for instance by the processor 101. Thereby, a maximum number of nodes in the conflict graph is found, where no edges exist between any chosen nodes. In other words, the MIS based scheduling algorithm finds a maximum number of flows that can be transmitted simultaneously without violating any TDD constraint, half-duplex constraint, and without any interference above the threshold value. The flows chosen by the algorithm are indexed with a unique ID, which is e.g. called "SDMA group ID" for SDMA groups, meaning those flows are scheduled at the same time.

As output message of the first step 201, after running the concurrent transmission scheduling algorithm, a scheduling table is output, for instance by the processor 101, which contains the group ID (SDMA group ID in FIG. 4) and the flows in each group 102 (e.g. indicated by start and end nodes). This information will be sent to the APs and UEs in a signalling exchange procedure, for example, over sub-6 GHz links as mentioned in the overall procedure above.

For the second step 202, as illustrated in FIG. 5 all the transmission flows are scheduled in one of the groups 102, a transmission duration of each group 102 is allocated, in order to decide the transmission duration for the corresponding flows. All the flows in each group 102 will be allocated the same transmission duration, for instance by the processor 101. Thereby, the total duration does preferably not exceed a superframe length.

As input message for the second step 202, the scheduling table resulting from the concurrent transmission scheduling described for the first step 201 is combined with user demand, which is acquired from the signalling exchange procedure after initial access.

For each group 102, the demand of all flows (required transmission duration) may be different. Accordingly, in each group 102 the maximum transmission duration is picked, and the actual allocated transmission duration of the flows in each group 102 is then proportional calculated by the maximum transmission duration and the total length of a superframe. More specifically, assuming that the maximum transmission duration of a group i is denoted as n_max^i, the allocated duration of group i is calculated as $$n\hat{}i = \lfloor (n\_\max\hat{}i)/(\Sigma\_i\ n\_\max\hat{}i) \rfloor \cdot N$$

In the above formula, N is the total length of a superframe and $\lfloor \ldots \rfloor$ indicates the floor function. After calculating the duration of each group 102, all the flows in the corresponding group 102 will be allocated the same transmission duration that equals to the duration of the group 102.

As output message of the second step 202, the duration of each group 102 (e.g. SDMA group) is output.

With the first two steps 201, 202 done, the BS will then inform the group ID and the transmission duration of each group 102 to the APs and UEs, for example, over sub-6 GHz links. In the remaining third step 203, as illustrated in FIG. 6, the transmission powers for all the flows are allocated. Due to an enabling of spatial multiplexing, flows transmitted from the same BS and/or APs simultaneously cannot each obtain a maximum transmission power. The power allocation scheme enhances network throughput. Here, a water-filling power allocation algorithm is preferably applied for concurrent flows transmitted from the same BS and/or APs in the distributed manner, and a maximum transmission power is kept for those flows without power constraints.

As input message for the third step 203, by mapping the group IDs, the BS and APs obtain their corresponding concurrent transmitted flows. Further input is a channel quality of the flows, for instance a channel gain of the flows, which may be acquired from initial access at the beginning of the overall procedure.

The water-filling power allocation algorithm gives preferably more power to flows with a higher channel quality, e.g. with a higher channel gain, and vice versa. As can be seen in FIG. 6, a channel quality of flow A-to-B is, for example, higher than that of flow A-to-G, and therefore more power (0.6w) is allocated to flow A-to-B compared to 0.4w on flow A-to-G. For the other flows shown in FIG. 6, a maximum transmission power can be allocated, as there is no power constraints on them.

As output message of the third step 203, the transmission power of each transmission flow is output.

Figure 7:
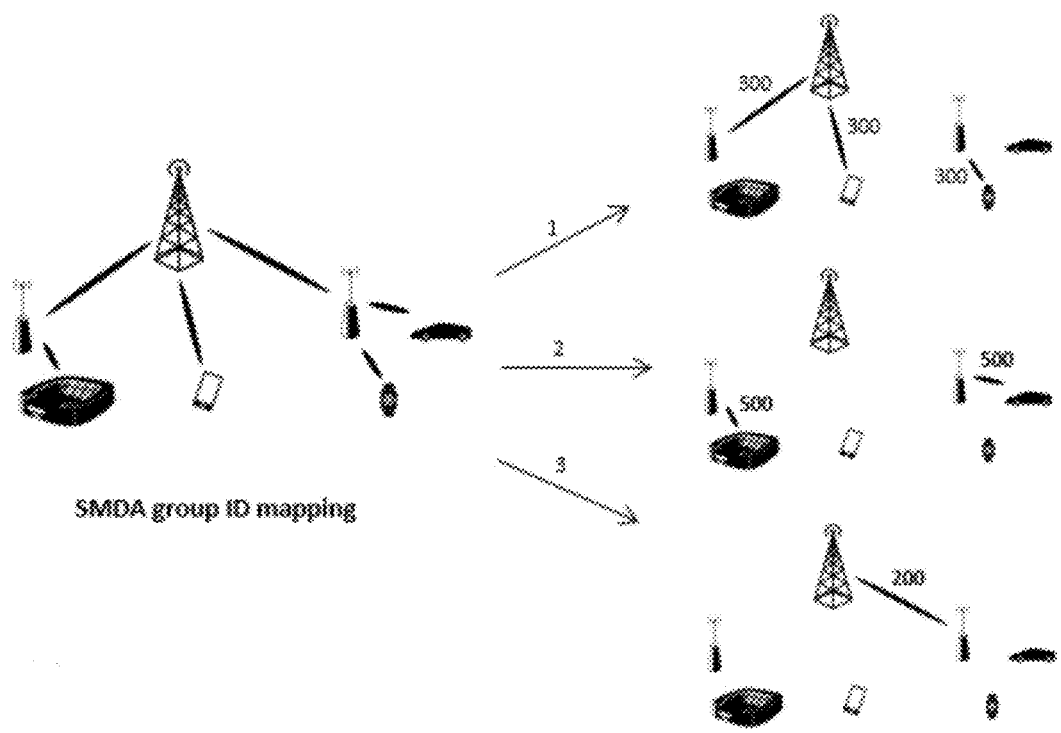
FIG. 7 illustrates a signaling procedure of initial access in single cell scenario and in an overlay mm-wave network.

Next, a low-overhead signalling method associated to the three main steps 201-203 is described in detail with respect to FIG. 7. The signalling method may provide an important information exchange among BS, APs and UEs, for example, over sub-6 GHz links. The major issue here is that signalling the transmission duration of all flows would require much control information, and consequently would increase the overhead. However, as the transmission duration of flows in each group 102 is the same, the BS preferably only exchanges the following information with the APs and UEs: group IDs, flows in each group 102, starting time of the first group 102, and duration of each group 102. Thereby, the overhead can be reduces significantly.

By mapping from the above information, the APs and UEs are able to know everything about the transmissions, including which flow to transmit at which time for how long, as well as when to switch to reception (DL/UL switch point). No further information is required. In this way, the signalling overhead remains small.

Figure 8:
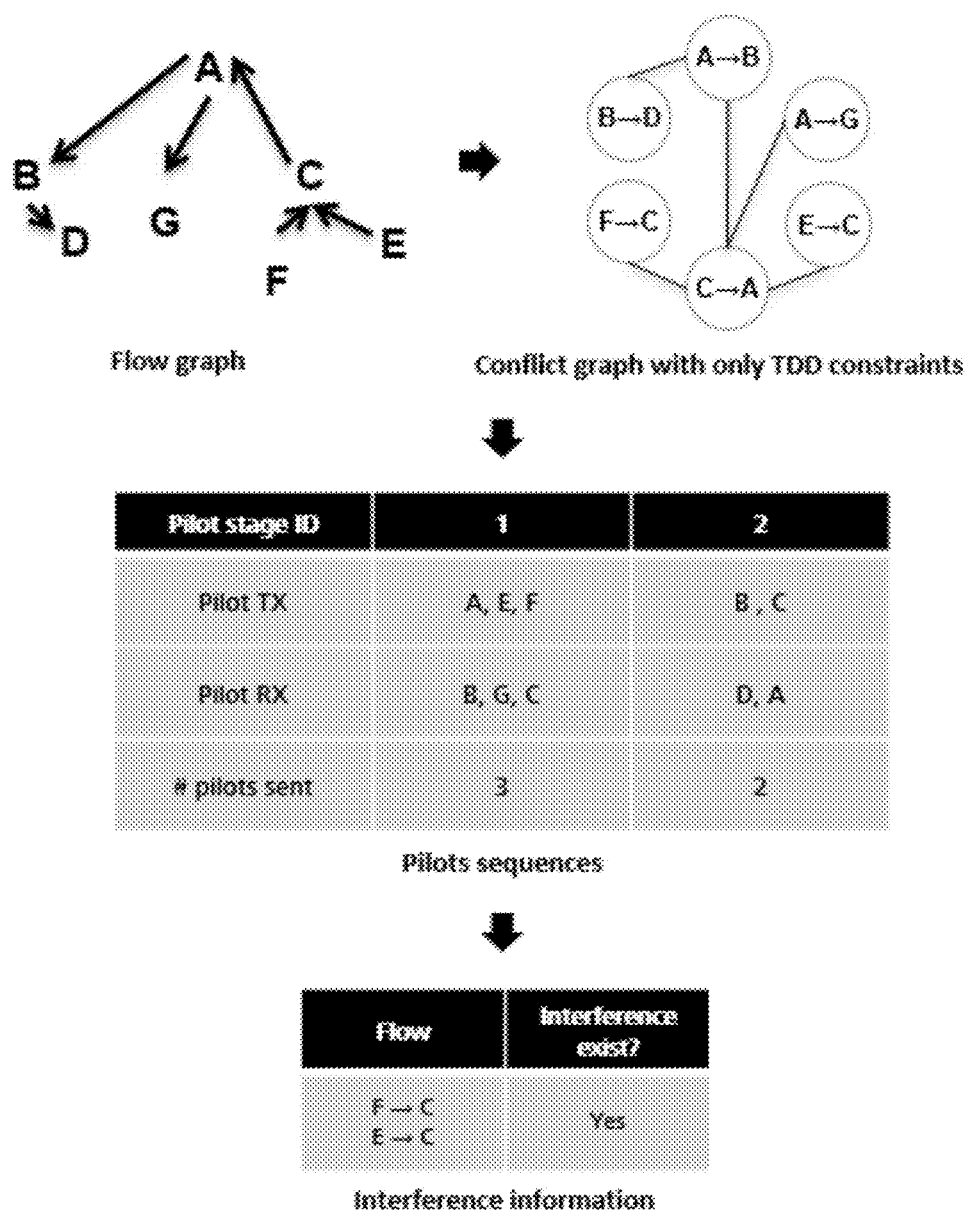
FIG. 8 illustrates an interference sensing procedure.

Next, the interference sensing procedure is described in more detail with respect to FIG. 8. As described above, the interference sensing is a long-period procedure, and is not executed so often (for example once per several superframes). To further increase the efficiency of the interference sensing procedure, the MIS based scheduling algorithm described above with respect to the first step 201 may be reused. To this end, a conflict graph may be constructed with only the TDD constraints, or half-duplex constraints, and the flows that can be simultaneously transmitted in this scenario may be found. After grouping the flows from the "scheduling" results, the BS already knows how many stages of pilots are needed for the interference sensing (similar as the groups 102 in concurrent transmission scheduling). More specifically, the transmitter (Tx) of the flows in each pilot stage will send pilots, and correspondingly the receiver (Rx) of those flows will receive. Orthogonal pilots are assumed to be available for interference sensing, and consequently, the number and duration of pilots used in each pilot stage depends on the number of flows "scheduled" in the pilot stage. After the interference sensing, the Rx of the pilots will report the interference information to the BS and/or APs over, for example, sub-6 GHz links.

Figure 9:
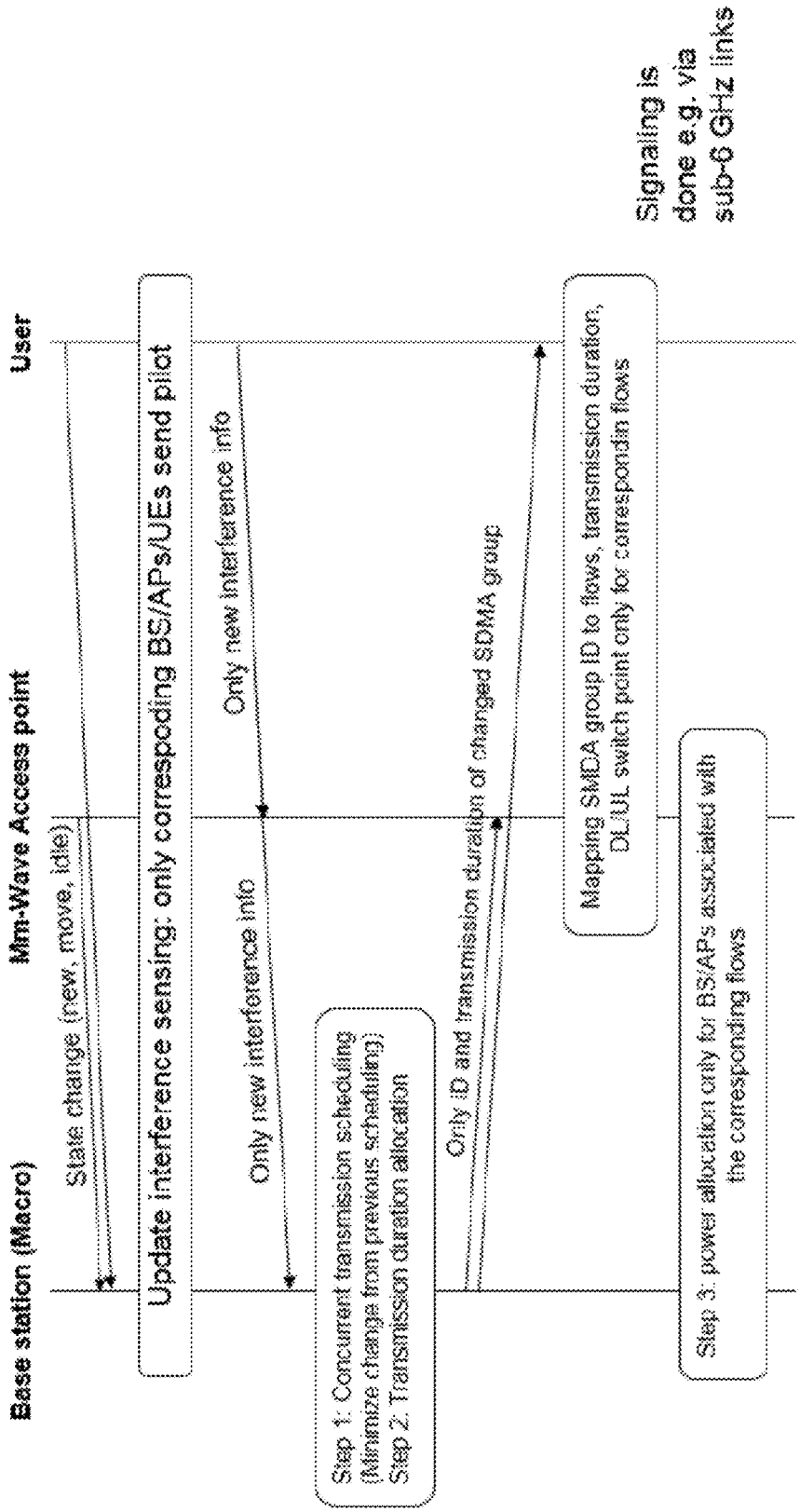
FIG. 9 shows a procedure of an UE-aware interference and scheduling update.

Next, a UE-aware interference and scheduling update procedure is described in detail with respect to FIG. 9. The interference situation in the network can be time-variant. In particular, the following events will lead to a change of the interference information: A new UE/AP emerges, a UE/AP moves, a UE/AP becomes idle.

These events preferably trigger the interference information update procedure at the BS as follows: When a New UE/AP appears, the BS is triggered by an initial access procedure. When a UE/AP moves, the BS is triggered by a beam tracking procedure. When a UE/AP becomes idle, the BS is informed by a timeout of RRC-connected state.

Based on this, the interference sensing needs to be re-executed, but preferably in a simplified manner compared to the overall interference scheduling, since the change is caused by only the APs/UEs (also BS) with the above events. Specifically, only corresponding APs/UEs may send pilot signals, while other nodes just receive. Afterwards, the APs/UEs, which sense the interference, report the new interference information, for instance to the BS or apparatus 100. Existing interference information preferably remains known, for instance at the BS or apparatus 100, which means no extra signalling is required.

Then, the BS updates the conflict graph described above with respect to step 201, and reruns the concurrent transmission scheduling and transmission duration allocation algorithm (Steps 1 and 2 in FIG. 9), and only sends updated part of the group ID to the corresponding AP/UE. The concurrent transmission scheduling inherently keeps the change of the scheduling results (from the previous results) as small as possible. The unchanged part of the mapping from group ID to transmission flows is preferably not signalled, and the corresponding UE/AP update group ID mapping and transmission duration allocation only for the corresponding flows. In the end, preferably only the BS and/or APs associated with the corresponding flows rerun the transmission power allocation (Step 3). Obviously, in this way the signalling overhead is kept very low.

Next, a TDD frame structure subframe mapping is described. From the information about the scheduling decision described above (such as group ID of flows, transmission duration), the APs and UEs are able to know everything about the transmissions, including which flow to transmit at which time and for how long, as well as when to switch to reception (DL/UL switch point in a TDD frame). No redundant information is necessary. Transmission duration allocation on each flow varies with concurrent transmission scheduling results in different superframes. As a consequence, each AP should be able to flexibly adjust the transmission duration of DL/UL accordingly. As mentioned above, with the group ID mapping and transmission duration of each group 102, the APs can derive the DL/UL switching point. By combining all the DL flows from the corresponding group ID, the APs can calculate the total DL transmission duration. This DL transmission duration is followed by a guard interval for the switching between DL and UL. After this guard interval, UL transmission will take place for a certain duration, which can be calculated similarly to that of the DL.

It is noted that embodiments of the present invention can also be easily extended to other optimization objectives, e.g. weighted sum-rate optimization, energy efficiency, etc. In weighted sum-rate optimization, since with the network throughput is maximized, reusing the proposed three steps 201-203 for resource allocation algorithm and the associated low-overhead signalling method with minor modifications on the objective function can also lead to maximizing the weighted sum-rate. In addition, for energy efficiency optimization, with concurrent transmission enabled, more time resource can be allocated to each flow. Therefore, the transmission power can be reduced, in order to achieve the same network throughput without concurrent transmission. Keeping the first two steps 201, 202 unchanged, the last step could be changed as allocating a transmit power to each flow for achieving the required minimum throughput.

Numerical evaluations are presented in the following with respect to the FIGS. 10-13, in order to demonstrate the benefits of embodiments of the present invention. For the numerical evaluations, the following system parameters are assumed: Urban scenario—Manhattan Grid; Carrier frequency of 28 GHz and 73 GHz; A conventional path loss model (as proposed in M. R. Akdeniz et al., "*Millimeter Wave Channel Modeling and Cellular Capacity Evaluation*" Selected Areas in Communications, IEEE Journal on, vol. 32, no. 6, pp. 1164-1179, 2014). Further, BS, AP and UE have 8×16 and 4×4 antenna array, respectively; an inter antenna element distance (half-lambda) is 4.55 mm and 2.085 mm at 28 GHz and 73 GHZ, respectively; a maximum transmission power of BS, AP and UE are 30 dBm and 20 dBm, respectively; and a traffic demand is 'full buffer'.

Figure 10:
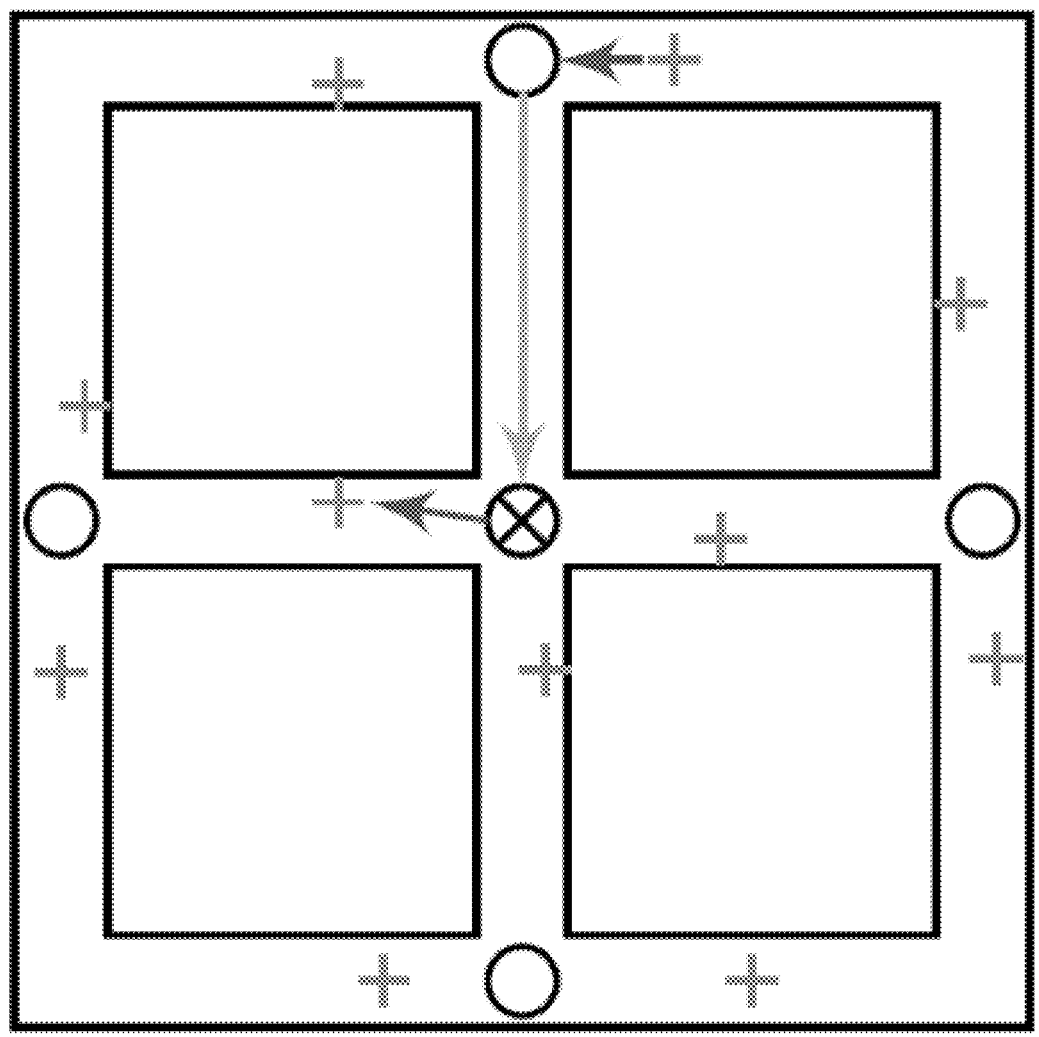
FIG. 10 illustrates an outdoor Manhattan grid for performance evaluation.

FIG. 10 illustrates an exemplary an outdoor Manhattan grid scenario for the performance evaluation below. In FIG. 10, buildings surrounded by streets are represented by the four squares. UEs are depicted by small crosses, and are uniformly distributed along streets. Arrows represent the two access links and a backhaul link, respectively.

Figure 11:
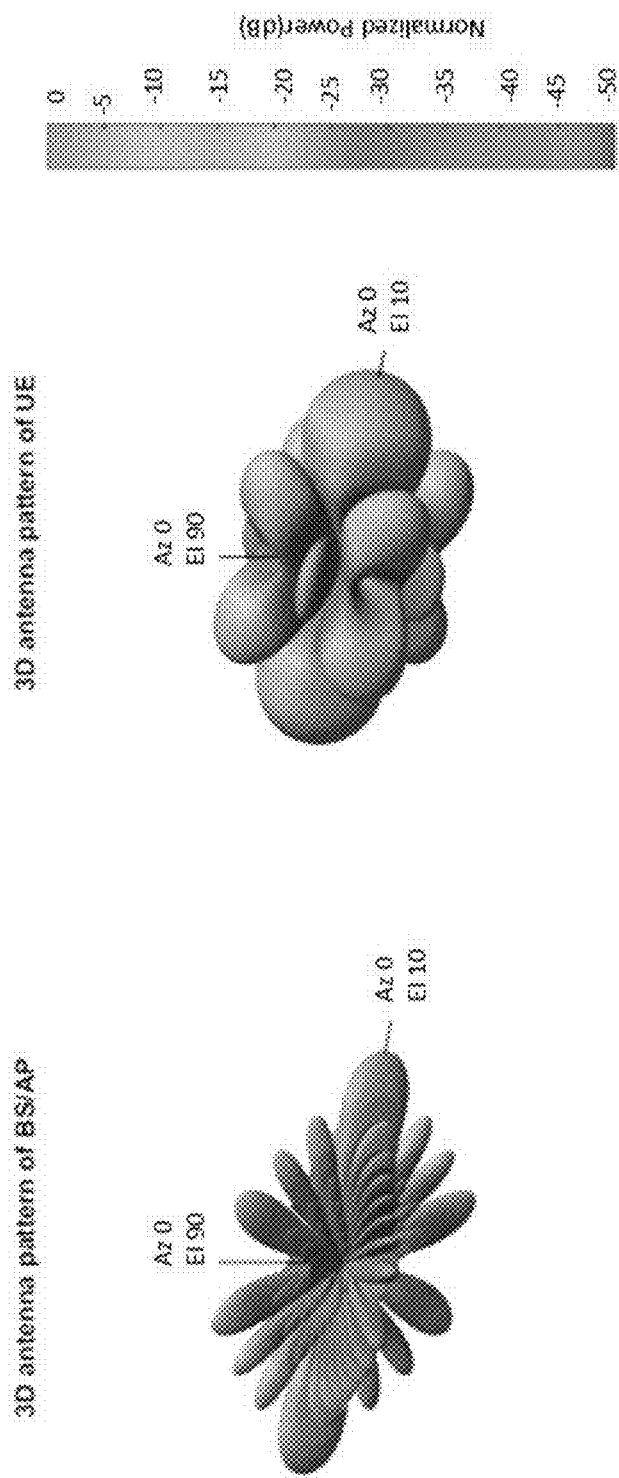
FIG. 11 shows a 3D antenna pattern of BS, AP and UE antenna arrays.

FIG. 11 shows a 3D antenna pattern of a BS/AP antenna array (left) and a UE antenna array (right).

Figure 12:
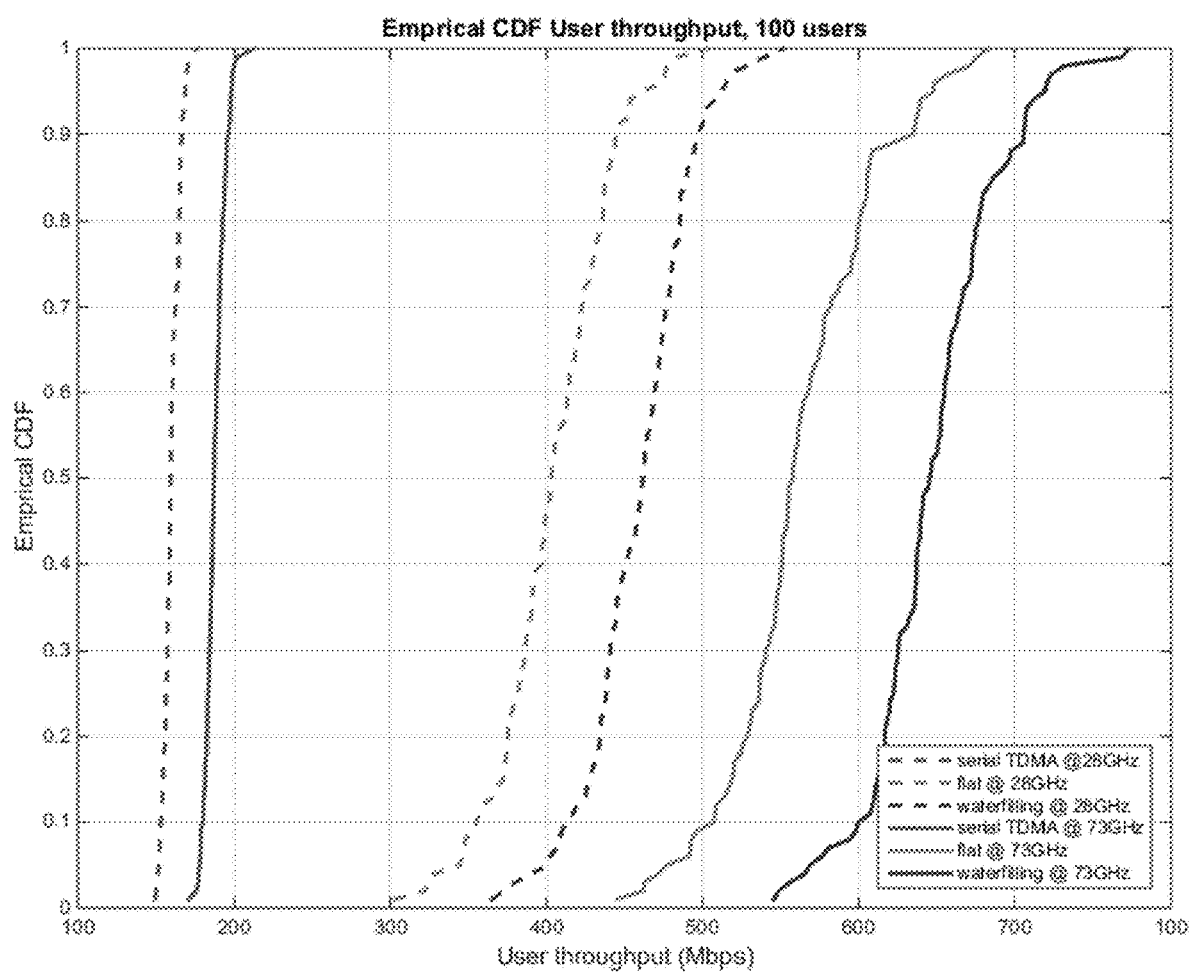
FIG. 12 shows a cumulative distribution function of average user throughputs of three schemes for 100 users.
Figure 13:
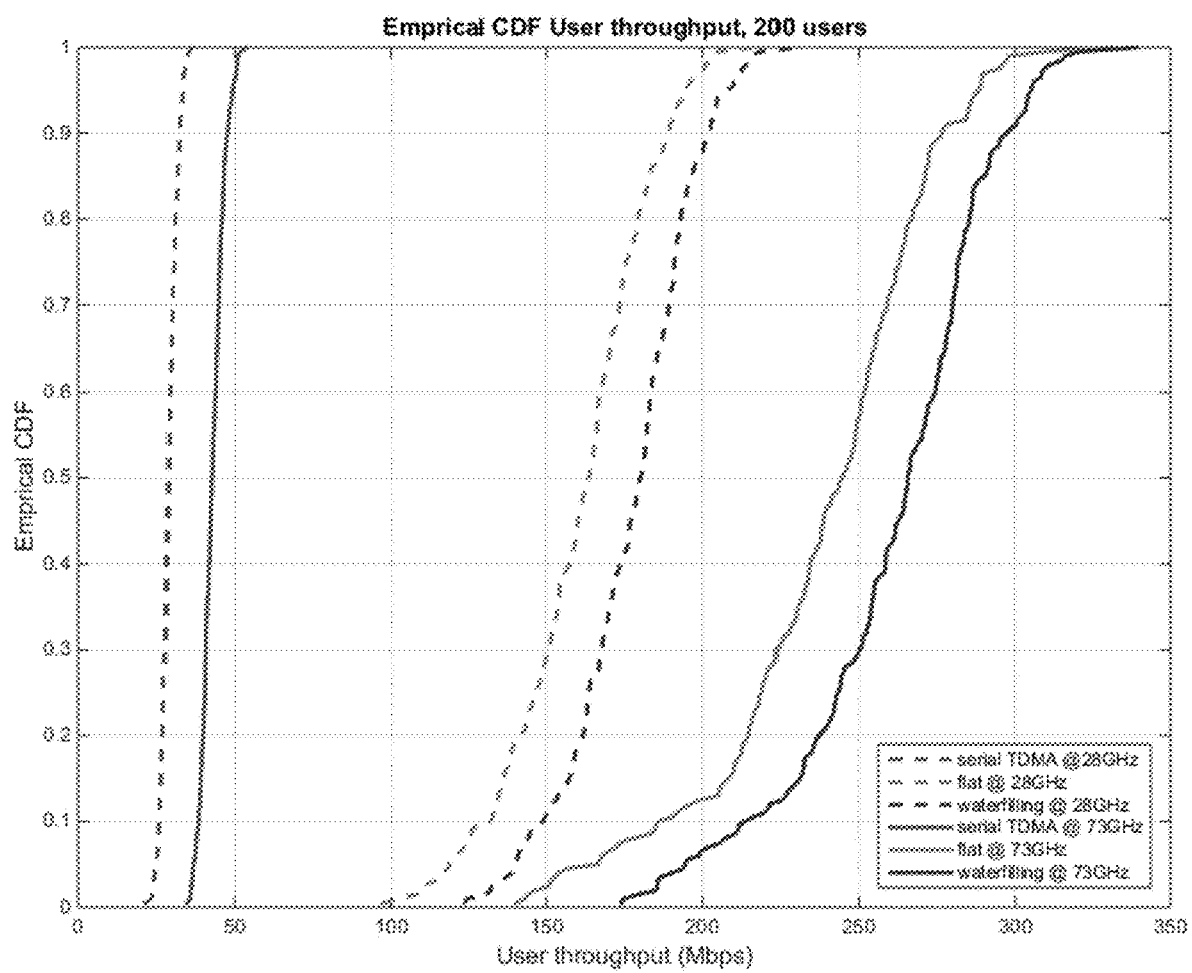
FIG. 13 shows a cumulative distribution function of average user throughputs of three schemes for 200 users.
Figure 14:
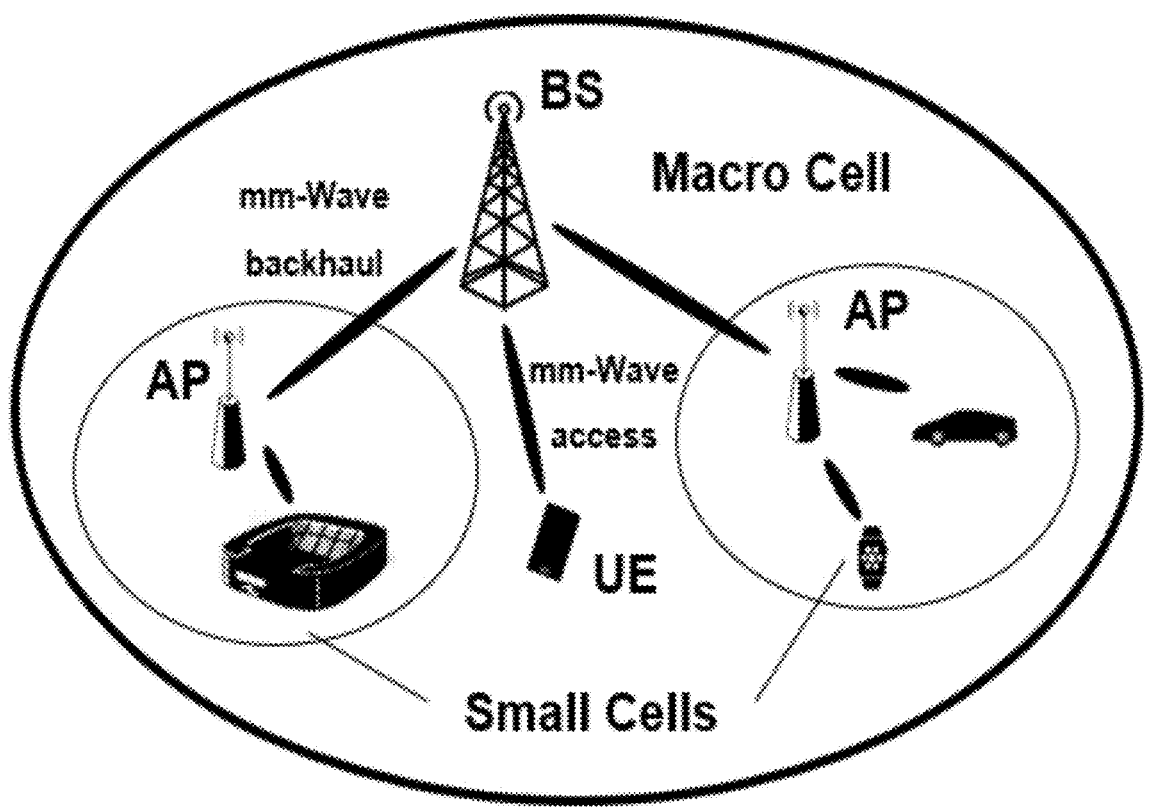
FIG. 14 illustrates a conventional mm-wave HetNet.

The FIGS. 12 and 13 show the average user throughputs of three different schemes for different total number of users. The three schemes are: A pure TDMA scheme, a scheduling scheme with only the first two steps 201 and 202 (concurrent transmission scheduling and transmission duration allocation) and, respectively, a scheme with all three steps 201-203. For each of the three schemes, dashed curves depict the user throughput at a carrier frequency of 28 GHz, and solid curves illustrate the user throughput at a carrier frequency of 73 GHz. All the throughputs are compared in cumulative distribution function (CDF).

As be seen in FIG. 12, implementing the three main steps 201-203 according to the embodiments of the present invention provides a considerable improvement in average user throughput at both carrier frequencies, particularly when compared to the TDMA scheme. Here, 100 users are assumed. 300 Mbps and 475 Mbps gain of average user throughput can be observed for 28 GHz and 73 GHz carrier frequency, respectively. Further, the scheme with all three steps 201-203 also outperforms the scheme with flat transmission power (only steps 201 and 202), which is consistent with the theoretical expectation that the power allocation further enhances the user throughput.

In FIG. 13 a similar trend is observable in both carrier frequencies. Increasing the number of users to 200 somewhat reduces the gain of average user throughput, due to a limited bandwidth, however, a 150 Mbps and 225 Mbps gain can still be observed between the scheme of embodiments of the present invention with three steps 201-203 and a TDMA scheme both at 28 GHz and 73 GHz carrier frequency.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An apparatus for scheduling and allocating radio resources, the apparatus comprising:
a processor; and
a memory coupled to the processor and having processor-executable instructions stored thereon, which when executed cause the processor to:
schedule a plurality of transmission flows into a plurality of groups according to a transmission request of at least one user equipment (UE) and interference information;
allocate a transmission duration to each transmission flow of the plurality of transmission flows, wherein transmission flows of a same group are allocated a same transmission duration, according to traffic demand information of the at least one UE;
allocate a transmission power to each transmission flow, wherein, for transmission flows of the same group, a total transmission power is allocated according to a channel quality of each transmission flow of the group;
schedule a plurality of pilot transmissions into a plurality of pilot stages according to the transmission request of the at least one UE and/or a transmission request of at least one access point (AP); and
search for a maximum number of pilot transmissions in each pilot stage of the plurality of pilot stages, wherein the maximum number of pilot transmissions can be transmitted simultaneously without violating any time division duplex (TDD) constraint or half-duplex constraint.

2. The apparatus according to claim 1, wherein the processor is further configured to:
transmit the transmission flows of the same group simultaneously and with the allocated transmission duration and the allocated transmission powers.

3. The apparatus according to claim 1, wherein, for the scheduling of the plurality of transmission flows, the processor is configured to:
search for a maximum number of transmission flows for each group, wherein the maximum number of transmission flows are transmitted simultaneously without violating any TDD constraint or half-duplex constraint, and without causing interference above a threshold value.

4. The apparatus according to claim 3, wherein, for the searching for the maximum number of transmission flows for each group, the processor is configured to:
generate a conflict graph according to the transmission request and the interference information, the conflict graph including nodes representing transmission flows, edges representing TDD constraints or half-duplex constraints, and interference above a threshold between two selected transmission flows; and
search for a maximum number of nodes in the conflict graph, for which no edge exists between any two selected nodes.

5. The apparatus according to claim 1, wherein, for the scheduling of the plurality of transmission flows, the processor is configured to:
associate each group and/or each transmission flow of the same group with a group identification.

6. The apparatus according to claim 5, wherein the processor is further configured to:
receive the interference information from the at least one UE or from the at least one AP, wherein the interference information is acquired by the at least one UE and/or the at least one AP in an interference sensing procedure.

7. The apparatus according to claim 6, wherein, for the interference sensing procedure of the at least one UE and/or the at least one AP, the processor is configured to:
determine a UE and/or an AP to transmit to a pilot at a pilot stage.

8. The apparatus according to claim 1, wherein, for the allocating of the transmission duration to each transmission flow, the processor is configured to:
determine a maximum transmission duration for the transmission flows of each group; and
obtain the transmission duration to be allocated to the transmission flows of each group based on the maximum transmission duration and a length of a superframe.

9. The apparatus according to claim 1, wherein, for the allocating of the transmission power to each transmission flow, the processor is configured to:
allocate a larger transmission power to a transmission flow with a higher channel quality, and allocate a smaller transmission power to a transmission flow with a lower channel quality.

10. The apparatus according to claim 1, wherein the processor is further configured to:
obtain the traffic demand information from the at least one UE during an initial access of the UE to a base station.

11. The apparatus according to claim 1, wherein the processor is further configured to:
exchange, by signaling with the at least one UE and/or with the at least one AP, a result of the scheduling of the transmission flows and a result of the allocating of the transmission durations.

12. The apparatus according to claim 11, wherein:
the result of the scheduling of the transmission flows comprises group identifications (ID) each group ID being associated to one group and/or to each transmission flow of one group, and
the result of the allocating of the transmission durations comprises a transmission duration of each group and a transmission start time of a first group.

13. The apparatus according to claim 1, wherein the processor is further configured to:
update the interference information, in response to a UE and/or an AP moving, becoming idle, and/or newly emerging; and
reschedule the transmission flows into a plurality of new groups according to the transmission request of the at least one UE and according to the updated interference information.

14. A method, by a base station (BS), for scheduling and allocating radio resources, the method comprising:

scheduling a plurality of transmission flows into a plurality of groups according to a transmission request of at least one user equipment (UE) and interference information;

allocating a transmission duration to each transmission flow of the plurality of transmission flows, wherein transmission flows of a same group are allocated a same transmission duration, according to traffic demand information of the at least one UE;

allocating a transmission power to each transmission flow, wherein, for transmission flows of the same group, a total transmission power is allocated according to a channel quality of each transmission flow of the group;

scheduling a plurality of pilot transmissions into a plurality of pilot stages according to the transmission request of the at least one UE and/or a transmission request of at least one access point (AP); and searching for a maximum number of pilot transmissions in each pilot stage of the plurality of pilot stages, wherein the maximum number of pilot transmissions can be transmitted simultaneously without violating any time division duplex (TDD) constraint or half-duplex constraint.

15. The method according to claim 14, wherein allocating the transmission power to each transmission flow is implemented by the at least one AP.

16. The method according to claim 14, further comprising:

transmitting the transmission flows of the same group simultaneously and with the allocated transmission duration and the allocated transmission powers.

17. The method according to claim 14, wherein the scheduling of the plurality of transmission flows comprises:

searching for a maximum number of transmission flows for each group, wherein the maximum number of transmission flows are transmitted simultaneously without violating any TDD constraint or half-duplex constraint, and without causing interference above a threshold value.

18. The method according to claim 17, wherein the searching for the maximum number of transmission flows for each group comprises:

generating a conflict graph according to the transmission request and the interference information, the conflict graph including nodes representing transmission flows, edges representing TDD constraints or half-duplex constraints, and interference above a threshold between two selected transmission flows; and searching for a maximum number of nodes in the conflict graph, for which no edge exists between any two selected nodes.

19. The apparatus according to claim 1, wherein the processor is further configured to:

obtain the channel quality of the transmission flows from the at least one UE during an initial access of the UE to a base station.

20. A non-transitory machine readable storage medium having stored thereon processor executable instructions which, when executed by a processor, cause the processor to control a system to perform a method, comprising:

scheduling a plurality of transmission flows into a plurality of groups according to a transmission request of at least one user equipment (UE) and interference information;

allocating a transmission duration to each transmission flow of the plurality of transmission flows, wherein transmission flows of a same group are allocated a same transmission duration, according to traffic demand information of the at least one UE;

allocating a transmission power to each transmission flow, wherein, for transmission flows of the same group, a total transmission power is allocated according to a channel quality of each transmission flow of the group;

scheduling a plurality of pilot transmissions into a plurality of pilot stages according to the transmission request of the at least one UE and/or a transmission request of at least one access point; and searching for a maximum number of pilot transmissions in each pilot stage of the plurality of pilot stages, wherein the maximum number of pilot transmissions can be transmitted simultaneously without violating any time division duplex constraint or half-duplex constraint.

* * * * *